United States Patent
Broderick et al.

(10) Patent No.: US 7,229,253 B2
(45) Date of Patent: Jun. 12, 2007

(54) FATIGUE-RESISTANT COMPONENTS AND METHOD THEREFOR

(75) Inventors: Thomas F. Broderick, Springboro, OH (US); Andrew P. Woodfield, Highland Heights, KY (US); Dale Robert Lombardo, Blueash, OH (US); Paul Robert Moncelle, Cincinnati, OH (US); William Terrence Dingwell, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 222 days.

(21) Appl. No.: 10/999,505

(22) Filed: Nov. 30, 2004

(65) Prior Publication Data

US 2006/0147311 A1 Jul. 6, 2006

(51) Int. Cl.
*F01D 5/14* (2006.01)

(52) U.S. Cl. ........................ 416/225; 415/235

(58) Field of Classification Search ................ 416/225, 416/228, 235, 236 R, 243
See application file for complete search history.

(56) References Cited

U.S. PATENT DOCUMENTS

| | | | |
|---|---|---|---|
| 4,909,859 A * | 3/1990 | Nazmy et al. | 148/518 |
| 5,569,018 A | 10/1996 | Mannava et al. | |
| 5,591,009 A * | 1/1997 | Mannava et al. | 416/241 R |
| 5,826,453 A | 10/1998 | Prevey, III | |
| 5,846,057 A * | 12/1998 | Ferrigno et al. | 416/241 R |
| 6,005,219 A | 12/1999 | Rockstroh et al. | |
| 6,969,821 B2 * | 11/2005 | Mika et al. | 219/121.83 |

* cited by examiner

*Primary Examiner*—Edward K. Look
*Assistant Examiner*—Devin Hanan
(74) *Attorney, Agent, or Firm*—Adams Evans P.A.; William Scott Andes

(57) ABSTRACT

A metallic component is by at least one peripheral edge. The component includes at least one elongated treated zone having a length substantially greater than its width. This treated zone is spaced away from and disposed generally parallel to the peripheral edge of the component and the entire thickness of the component within the treated zone is in a state of residual compressive stress. Crack growth from the edge due to fatigue or damage is resisted.

18 Claims, 3 Drawing Sheets

FATIGUE-RESISTANT COMPONENTS AND METHOD THEREFOR

BACKGROUND OF THE INVENTION

This invention relates generally to metallic components and more particularly for a method of producing fatigue-resistant and damage-tolerant metallic components.

Various metallic components, such as gas turbine engine fan and compressor blades, are susceptible to cracking from fatigue and damage (e.g. from foreign object impacts). This damage reduces the life of the part, requiring repair or replacement.

It is known to protect components from crack propagation by inducing residual compressive stresses therein. Methods of imparting this stress include shot peening, laser shock peening (LSP), pinch peening, and low plasticity burnishing (LPB). These methods are typically employed by applying a "patch" of residual compressive stresses over an area to be protected from crack propagation, for example a leading edge of a gas turbine engine compressor blade. However, this process is relatively slow and expensive. This procedure also modifies areas of the blade in which the aerodynamic performance is quite sensitive to dimensional variations.

Accordingly, there is a need for a method of protecting metallic components from crack propagation without altering the performance characteristics thereof.

BRIEF SUMMARY OF THE INVENTION

The above-mentioned need is met by the present invention, which according to one aspect provides a metallic component bounded by at least one peripheral edge. The component includes at least one elongated treated zone which is spaced away at an offset distance from and the peripheral edge. The entire thickness of the component within the treated zone is in a state of residual compressive stress, such that crack growth from the peripheral edge is resisted.

According to another aspect of the invention, a metallic airfoil for a gas turbine engine includes a root spaced apart from a tip, spaced-apart leading and trailing edges, a suction side extending from the leading edge to the trailing edge, and an opposed pressure side extending from the leading edge to the trailing edge, wherein a thickness of the airfoil is defined between the pressure side and the suction side. The airfoil includes at least a first elongated treated zone within which the entire thickness of the airfoil is under residual compressive stress. The treated zone is spaced apart at a first offset distance from a selected one of the leading edge, the trailing edge, or the tip. The treated zone resists the growth of cracks propagating from the selected leading edge, trailing edge, or tip, respectively.

According to another aspect of the invention, a method of reducing crack propagation in metallic components includes providing a metallic component which is bounded by at least one peripheral edge, the component including at least one crack-prone area bounded in part by the peripheral edge. Pressure is applied to the component in at least one elongated treated zone, such that the entire thickness of the component within the treated zone is left a state of residual compressive stress, such that cracks are prevented from propagating out of the crack-prone zone.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
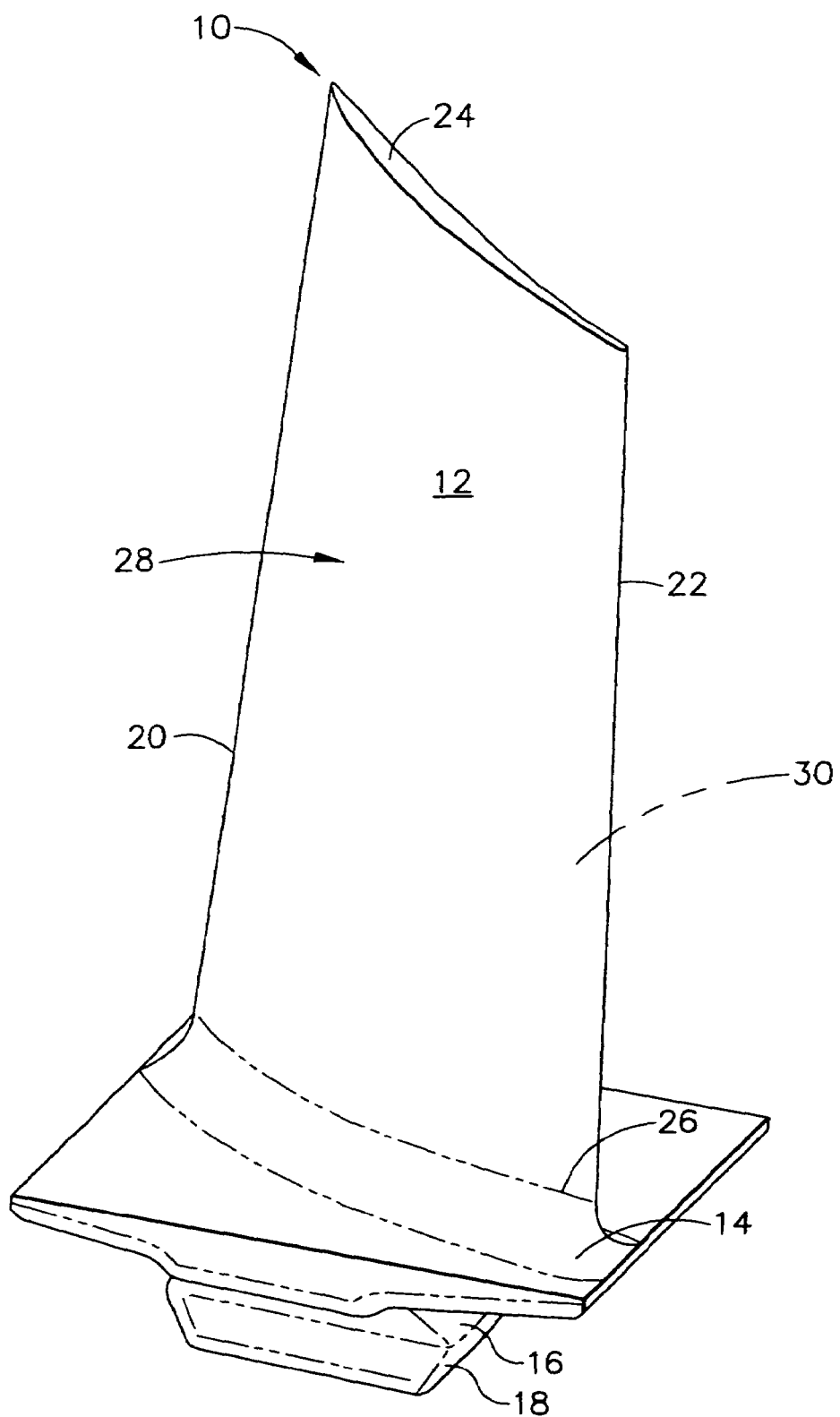
FIG. 1 is a schematic perspective view of a prior art gas turbine engine compressor blade.

Referring to the drawings wherein identical reference numerals denote the same elements throughout the various views, FIG. 1 illustrates an exemplary gas turbine engine compressor blade 10. This component is used merely as an example, and the present invention is equally applicable to other types of metallic components susceptible to cracking from fatigue or damage, such as compressor stator vanes, fan blades, turbine blades, shafts and rotors, stationary frames, actuator hardware and the like. The compressor blade 10 comprises an airfoil 12, a platform 14, and a shank 16. In this particular example the shank 16 includes a dovetail 18 for being received in a slot of a rotating disk (not shown). The airfoil 12 has a leading edge 20, a trailing edge 22, a tip 24, a root 26, a suction side 28, and a pressure side 30.

Figure 2:
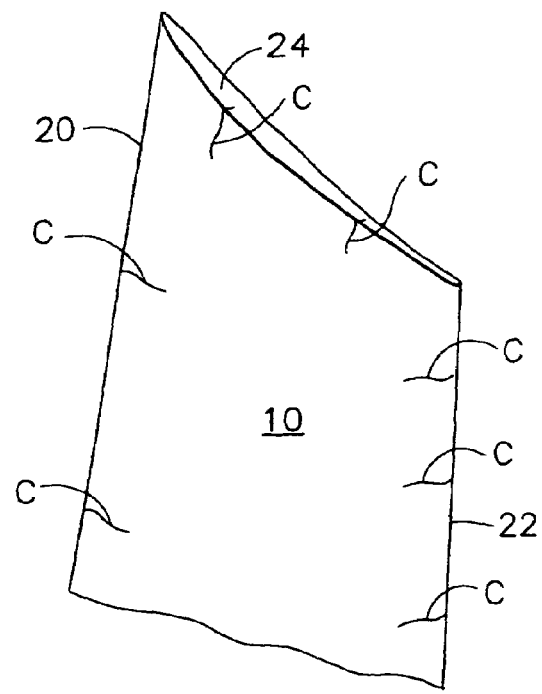
FIG. 2 is a side view of the compressor blade of FIG. 2.

FIG. 2 shows an enlarged portion of the compressor blade 10. Certain areas of the compressor blade 10 are "crack-prone" or particularly subject to crack initiation, for example because of fatigue or damage from foreign object impacts. These areas include the leading edge 20, the trailing edge 22, and the tip 24. Exemplary cracks "C" are shown in these areas of the compressor blade 10. If the compressor blade 10 is left in service, the cracks C will propagate further into the compressor blade 10, eventually rendering it unfit for further service or even causing component failure.

It is known to apply areas of residual compressive stress to metallic components to prevent or delay cracking. In the prior art, relatively large areas of residual compressive stress are applied to vulnerable areas such as the above-mentioned leading edge 20, trailing edge 22, and tip 24. However, these surface area patches applied at the edge of a component are inefficient. First, they are expensive and time consuming because of the relatively large areas involved. Second, certain areas of the compressor blade 10 are critical to the aerodynamic performance, for example the leading and trailing edges, and are sensitive to small dimensional changes that the surface area patch can induce.

Figure 3:
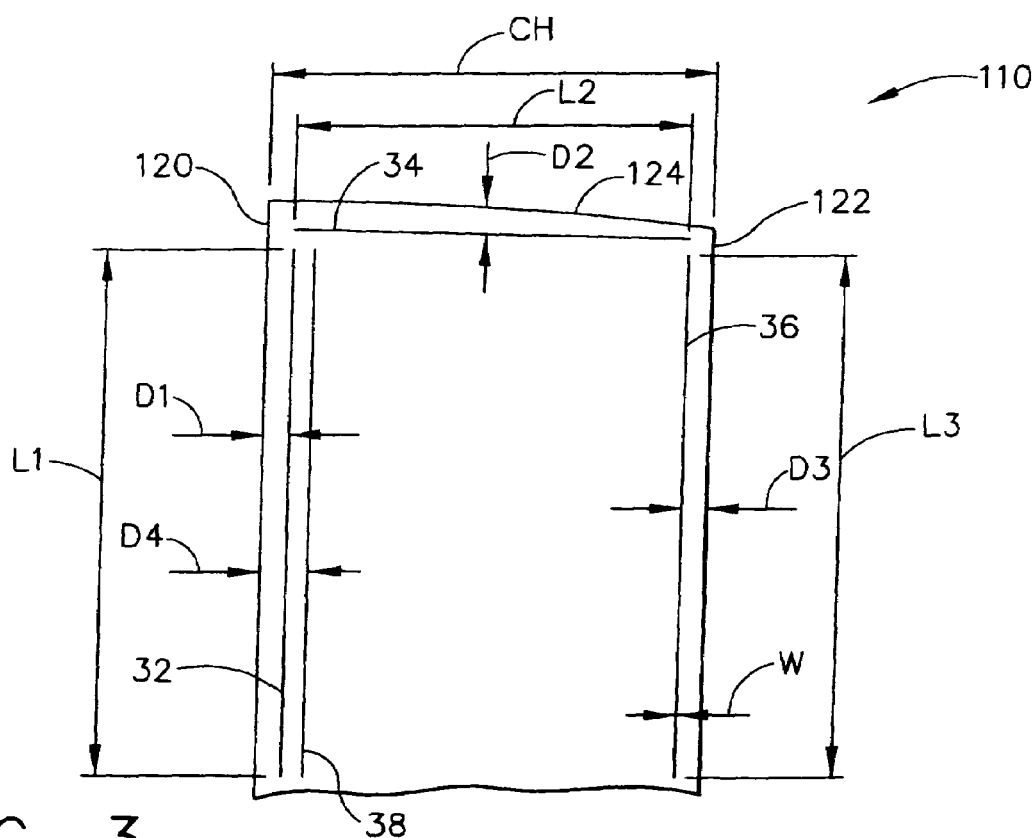
FIG. 3 is a side view of another compressor blade treated in accordance with the method of the present invention.

FIG. 3 shows a compressor blade 110 which has been treated in accordance with the present invention. The compressor blade 110 is substantially similar in construction to the compressor blade 10 and includes leading edge 120, trailing edge 122, and tip 124. The compressor blade 110 incorporates thin treated zones therein. Within each treated zone, the material of the compressor blade 110 is in a condition of residual compressive stress throughout its thickness. A first treated zone 32 extends in a generally radial direction at a first offset distance D1 from the leading edge 120. A second treated zone 34 extends in a generally chordwise direction at a second offset distance D2 from the tip 124. A third treated zone 36 extends in a generally radial direction at a third offset distance D3 from the trailing edge 122. In the illustrated example the treated zones 32, 34, and 36 are depicted as straight lines. The offset distances D1, D2, D3 will vary with the particular application but may generally be selected small enough to stop a crack before it exceeds the maximum length allowable in service, and large enough that the treated zone can be positioned in a reproducible manner (i.e. away from highly curved features). The offset distances D1, D2, D3 are also preferably selected to place the treated zones outside any areas which are aerodynamically sensitive to dimensional changes. For example, in a compressor blade 110 constructed of a Ti 4-4-2 alloy, the offset distance D1 may be about 0.25 mm (0.01 in.) to about 1.3 mm (0.05 in.) The treated zones 32, 34, and 36 each have a width "W" which is selected to be wide enough to effectively stop crack propagation while minimizing the number of burnishing or peening passes required. In the illustrated example, the width W may be about 0.13 mm (0.005 in.) to about 0.25 mm (0.01 in.) The lengths of the treated zones D1, D2, and D3, denoted L1, L2, and L3, respectively, may be substantially greater than the width W in order to simplify the treatment process.

Figure 4:
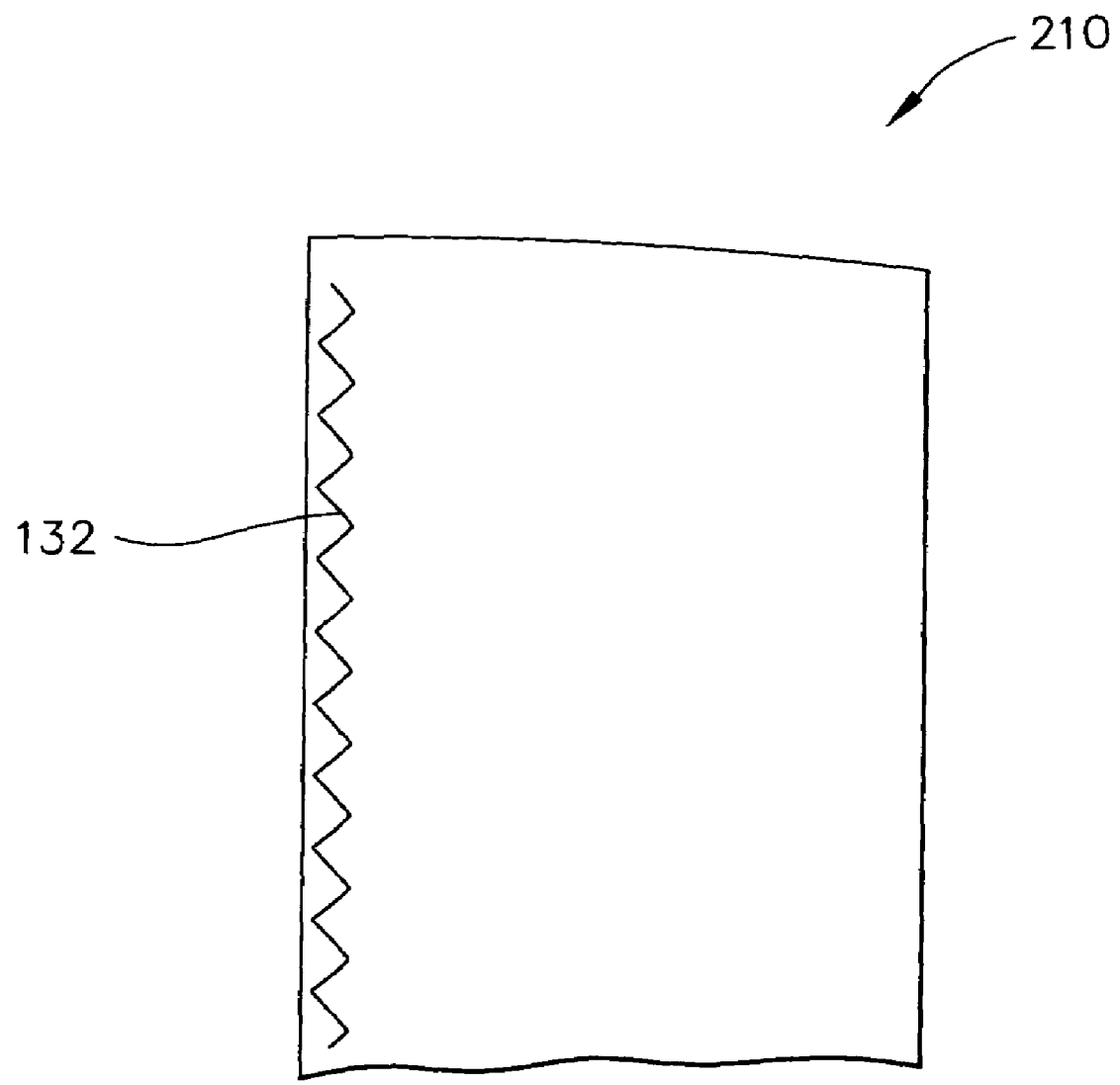
FIG. 4 is a side view of another compressor blade treated in accordance with the present invention.

The treated zones 32, 34, and 36 need not be linear, and other patterns such as curves may be used to suit a particular application. For example, as shown in FIG. 4, a compressor blade 210 may include a treated zone 132 having a shape comprising a series of angled segments or "chevrons". The treated zone could also comprise a matrix of densely spaced point or dots.

One or more additional treated zones of residual compressive stress may be applied to the compressor blade 110 to further reduce crack propagation. For example, a supplemental treated zone 38 (see FIG. 3) extends in a generally radial direction at a supplemental offset distance D4 from the leading edge 120, which is greater that the first offset distance D1. The length-to-width ratio of this supplemental treated zone 38 is similar to that of the treated zones described above. This stops the growth of any cracks which may extend past the first treated zone 36. If desired, further treated zones (not shown) could be applied behind the supplemental treated zone 38.

The zones of residual compressive stress may be applied by a number of methods. Examples of known suitable methods include laser shock peening (LSP), pinch peening, shot peening, low plasticity burnishing (LPB), or the use of a textured forming die. One preferred method is low plasticity burnishing, in which a normal force is applied to the compressor blade 110 using a stylus of a known type (not shown). The stylus is translated along the surface of the compressor blade 110 form the intended treated zone of residual compressive stress. The amount of cold-working applied to the compressor blade 110 during this process is of relatively little concern given the anticipated operating conditions.

In operation, the compressor blade 110 will be subjected to fatigue and damage that tends to cause cracking. The cracks initiate in "crack-prone" areas which may be relatively thin, which are exposed to debris impact, or which contain edges or geometric features that cause stress risers. Examples of such crack-prone areas include the leading edge 120, tip 124, and the trailing edge 122 as discussed above. Unchecked, these cracks would grow and extend further into the compressor blade 110, until eventually the compressor blade failed in service or could not be economically repaired.

However, with the treatment as described herein, any cracks which initiate in the peripheral areas of the compressor blade 110 will eventually intersect one of the treated zones which resists crack propagation. The crack size will thus be limited to an acceptable value, which prevents catastrophic failure and improves the chances of successful repair of the compressor blade 110. In particular, the presence of the treated zones as described above allows the service limits for crack propagation to be "opened up"—in other words, because the limit of crack propagation is rendered more predictable, a smaller margin of safety is required and the crack may safely be allowed to become larger than in an untreated component, before the treated component is removed from service.

The treatment described in this application may be used with newly made components. However, there is also significant repair activity on components such as compressor blades. The methods described in this application can enhance the performance of repaired blades. Repaired blades typically have their dimensions restored by welding, which often has inferior fatigue behavior as compared to the original components. By applying one or more treated zones to a repaired component as described herein, their fatigue and life resistance to crack propagation can be enhanced.

The foregoing has described fatigue- and damage-resistant components and methods for making such components. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A metallic component bounded by at least one peripheral edge, said component comprising:
   (a) an elongated first treated zone and a supplemental treated zone, said first treated zone being spaced away at a first offset distance from said peripheral edge and said supplemental treated zone disposed generally parallel to and spaced apart at a supplemental offset distance, greater than said first offset distance, from said peripheral edge, wherein the entire thickness of said component within said first and supplemental treated zones is in a state of residual compressive stress, such that crack growth from said peripheral edge is resisted; and
   (b) an untreated zone disposed between the first and the supplemental zones.

2. The metallic component of claim 1 wherein said treated zone is disposed generally parallel to said peripheral edge and has a length in a direction generally parallel to said peripheral edge substantially greater than its width.

3. The metallic component of claim 2 wherein said width is from about 0.13 mm (0.005 in.) to about 0.25 mm (0.01 in.).

4. The metallic component of claim 1 wherein said offset distance is from about 0.25 mm (0.01 in.) to about 1.3 mm (0.05 in.).

5. The metallic component of claim 1 wherein at least a portion of the thickness of said airfoil within said untreated zone is not under residual compressive stress.

6. A metallic airfoil for a gas turbine engine, comprising:
   (a) a root spaced apart from a tip, spaced-apart leading and trailing edges, a suction side extending from said leading edge to said trailing edge, and an opposed pressure side extending from said leading edge and said trailing edge, wherein a thickness of said airfoil is defined between said pressure side and said suction side; and (b) a first elongated treated zone and a supplemental elongated treated zone within which the entire thickness of said airfoil is under residual compressive stress, said first treated zone being spaced apart at a first offset distance from a selected one of said leading edge, said trailing edge, or said tip, and said supplemental treated zone being spaced apart from said first elongated treated zone such that said first and supplemental zones are separated by an untreated zone, within which at least a portion of the airfoil is not under residual compressive stress, such that said treated zones resist the growth of cracks propagating from said selected leading edge, said trailing edge, or said tip, respectively.

7. The metallic airfoil of claim 6 wherein said first treated zone is disposed generally parallel to said selected leading edge, said trailing edge, or said tip, and a length of said first treated zone in a direction generally parallel to said selected leading edge, said trailing edge, or said tip is substantially greater than a width of said first treated zone.

8. The metallic airfoil of claim 7 wherein said width is from about 0.13 mm (0.005 in.) to about 0.25 mm (0.01 in.).

9. The metallic airfoil of claim 6 wherein said first offset distance is from about mm (0.01 in.) to about 1.3 mm (0.05 in.).

10. The metallic airfoil of claim 6 wherein said first treated zone is disposed adjacent said leading edge, and said first offset distance is selected to avoid aerodynamic interference with said leading edge.

11. The metallic airfoil of claim 10 further including a second elongated treated zone within which the entire thickness of said airfoil is under residual compressive stress, said second treated zone disposed generally parallel to and spaced apart at a second offset distance from said trailing edge.

12. The metallic airfoil of claim 11 wherein said second offset distance is selected to avoid aerodynamic interference with said trailing edge.

13. A method of reducing crack propagation in metallic components, comprising:

(a) providing a metallic component which is bounded by at least one peripheral edge, said component including at least one crack-prone area bounded in part by said peripheral edge;

(b) applying pressure to said component in elongated first and supplemental treated zones, such that the entire thickness of said component within said treated zones is left at a state of residual compressive stress, such that cracks are prevented from propagating out of said crack-prone zone, wherein said first treated zone is offset from the peripheral edge by an offset distance and a nontreated zone is positioned between the first treated zone and the supplemental zone.

14. The method of claim 13 wherein a length of said first treated zone is substantially greater than a width of said zone.

15. The method of claim 13 wherein a length of said first treated zone in a direction generally parallel to said peripheral edge is substantially greater than a width of said first treated zone.

16. The method of claim 15 wherein said width is from about 0.13 mm (0.005 in.) to about 0.25 mm (0.01 in.).

17. The method of claim 13 wherein said offset distance is from about 0.25 mm (0.01 in.) to about 1.3 mm (0.05 in.).

18. The method of claim 13 wherein at least a portion of the thickness of said airfoil within said nontreated zone is not under residual compressive stress.

* * * * *

(12) EX PARTE REEXAMINATION CERTIFICATE (7013th)
United States Patent
Broderick et al.

(10) Number: US 7,229,253 C1
(45) Certificate Issued: Aug. 18, 2009

(54) FATIGUE-RESISTANT COMPONENTS AND METHOD THEREFOR

(75) Inventors: Thomas F. Broderick, Springboro, OH (US); Andrew P. Woodfield, Highland Heights, KY (US); Dale Robert Lombardo, Blueash, OH (US); Paul Robert Moncelle, Cincinnati, OH (US); William Terrence Dingwell, Lebanon, OH (US)

(73) Assignee: General Electric Company, Schenectady, NY (US)

Reexamination Request:
No. 90/008,784, Aug. 2, 2007

Reexamination Certificate for:
Patent No.: 7,229,253
Issued: Jun. 12, 2007
Appl. No.: 10/999,505
Filed: Nov. 30, 2004

(51) Int. Cl.
*F01D 5/14* (2006.01)

(52) U.S. Cl. ......................................... 416/225; 416/235

(58) Field of Classification Search .................. None
See application file for complete search history.

(56) References Cited

U.S. PATENT DOCUMENTS

| 5,591,009 A | 1/1997 | Mannava et al. |
| 6,144,012 A | 11/2000 | Dulaney et al. |
| 6,752,593 B2 | 6/2004 | Clauer et al. |

OTHER PUBLICATIONS

Hammersley et al, "Surface prestressing to improve fatigue strength of components by laser shot peening," Optics & Lasers in Engineering, 2000, p. 327–337, v. 34, Elsevier, UK.

*Primary Examiner*—Catherine S. Williams

(57) ABSTRACT

A metallic component is by at least one peripheral edge. The component includes at least one elongated treated zone having a length substantially greater than its width. This treated zone is spaced away from and disposed generally parallel to the peripheral edge of the component and the entire thickness of the component within the treated zone is in a state of residual compressive stress. Crack growth from the edge due to fatigue or damage is resisted.

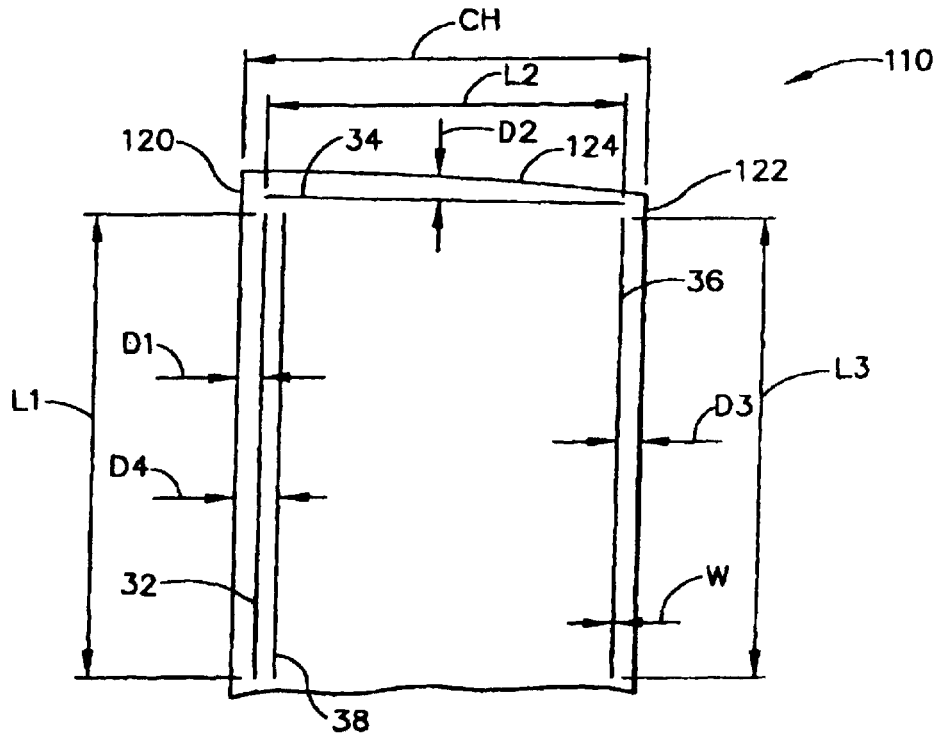

US 7,229,253 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–5, 7–8 and 14–16 are cancelled.

Claims 6, 9, 13 and 17 are determined to be patentable as amended.

Claims 10–12 and 18, dependent on an amended claim, are determined to be patentable.

6. A metallic airfoil for a gas turbine engine, comprising:
(a) a root spaced apart from a tip, spaced-apart leading and trailing edges, a suction side extending from said leading edge to said trailing edge, and an opposed pressure side extending from said leading edge and said trailing edge, wherein a thickness of said airfoil is defined between said pressure side and said suction side; and
(b) a first elongated treated zone and a supplemental elongated treated zone within which the entire thickness of said airfoil is under residual compressive stress, said first treated zone being spaced apart at a first offset distance from a selected one of said leading edge, said trailing edge, or said tip, and said supplemental treated zone being spaced apart from said first elongated treated zone such that said first and supplemental zones are separated by an untreated zone, within which at least a portion of the airfoil is not under residual compressive stress, such that said treated zones resist the growth of cracks propagating from said selected leading edge, said trailing edge, or said tip, respectively;
*wherein said first treated zone is disposed generally parallel to said selected leading edge, said trailing edge, or said tip, and a length of said first treated zone in a direction generally parallel to said selected leading edge, said trailing edge, or said tip is substantially greater than a width of said first treated zone, wherein said width is from about 0.13 mm (0.005 in.) to about 0.25 mm (0.01 in.); and*
*further wherein said first offset distance is equal to or less than a predetermined maximum acceptable crack length.*

9. [The metallic airfoil of claim 6] *A metallic airfoil for a gas turbine engine, comprising:*
*(a) a root spaced apart from a tip, spaced-apart leading and trailing edges, a suction side extending from said leading edge to said trailing edge, and an opposed pressure side extending from said leading edge and said trailing edge, wherein a thickness of said airfoil is defined between said pressure side and said suction side; and*
*(b) a first elongated treated zone and a supplemental elongated treated zone within which the entire thickness of said airfoil is under residual compressive stress, said first treated zone being spaced apart at a first offset distance from a selected one of said leading edge, said trailing edge, or said tip, and said supplemental treated zone being spaced apart from said first elongated treated zone such that said first and supplemental zones are separated by an untreated zone, within which at least a portion of the airfoil is not under residual compressive stress, such that said treated zones resist the growth of cracks propagating from said selected leading edge, said trailing edge, or said tip, respectively;*
*wherein said first treated zone is disposed generally parallel to said selected leading edge, said trailing edge, or said tip, and a length of said first treated zone in a direction generally parallel to said selected leading edge, said trailing edge, or said tip is substantially greater than a width of said first treated zone; and*
*further wherein said first offset distance is about 0.25 mm (0.01 in.) to about 1.3 mm (0.05 in.) and is equal to or less than a predetermined maximum acceptable crack length.*

13. A method of reducing crack propagation in [metallic components] *an airfoil for a gas turbine engine*, comprising:
(a) providing a metallic [component which is bounded by at least one peripheral edge, said component including at least one crack-prone area bounded in part by said peripheral edge] *airfoil comprising a root spaced apart from a tip, spaced-apart leading and trailing edges, a suction side extending from said leading edge to said trailing edge, and an opposed pressure side extending from said leading edge and said trailing edge, wherein a thickness of said airfoil is defined between said pressure side and said suction side, wherein at least one crack-prone area is bounded at least in part by said tip, said leading edge, or said trailing edge*;
(b) applying pressure to said [component] *airfoil* in elongated first and supplemental treated zones, such that the entire thickness of said [component] *airfoil* within said treated zones is left at a state of residual compressive stress, *said first treated zone being spaced apart at a first offset distance from a selected one of said leading edge, said trailing edge, or said tip, and said supplemental treated zone being spaced apart from said first elongated treated zone,* such that cracks are prevented from propagating out of said crack-prone [zone] *area*, wherein [said first treated zone is offset from the peripheral edge by an offset distance and] a nontreated zone is positioned between the first treated zone and the supplemental zone;
*wherein said first treated zone is disposed generally parallel to said selected leading edge, said trailing edge, or said tip, and a length of said first treated zone in a direction generally parallel to said selected leading edge, said trailing edge, or said tip is substantially greater than a width of said first treated zone, wherein said width is from about 0.13 mm (0.005 in.) to about 0.25 mm (0.01 in.); and*
*further wherein said first offset distance is equal to or less than a predetermined maximum acceptable crack length.*

[17. The method of claim 13] *A method of reducing crack propagation in an airfoil for a gas turbine engine, comprising:*
*(a) providing a metallic airfoil comprising a root spaced apart from a tip, spaced-apart leading and trailing edges, a suction side extending from said leading edge* to said trailing edge, and an opposed pressure side extending from said leading edge and said trailing edge, wherein a thickness of said airfoil is defined between said pressure side and said suction side, wherein at least one crack-prone area is bounded at least in part by said tip, said leading edge, or said trailing edge;

(b) applying pressure to said airfoil in elongated first and supplemental treated zones, such that the entire thickness of said airfoil within said treated zones is left at a state of residual compressive stress, said first treated zone being spaced apart at a first offset distance from a selected one of said leading edge, said trailing edge, or said tip, and said supplemental treated zone being spaced apart from said first elongated treated zone, such that cracks are prevented from propagating out of said crack-prone area, wherein a nontreated zone is positioned between the first treated zone and the supplemental zone;

wherein said first treated zone is disposed generally parallel to said selected leading edge, said trailing edge, or said tip, and a length of said first treated zone in a direction generally parallel to said selected leading edge, said trailing edge, or said tip is substantially greater than a width of said first treated zone; and

*further* wherein said *first* offset distance is from about 0.25 mm (0.01 in.) to about 1.3 mm (0.05 in.) *and is equal to or less than a predetermined maximum acceptable crack length.*

* * * * *